(12) United States Patent
Akimoto

(10) Patent No.: US 12,420,462 B2
(45) Date of Patent: Sep. 23, 2025

(54) MOLDED BODY AND PRODUCTION METHOD THEREOF

(71) Applicant: DENSO CORPORATION, Kariya (JP)

(72) Inventor: Rentarou Akimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 257 days.

(21) Appl. No.: 17/663,472

(22) Filed: May 16, 2022

(65) Prior Publication Data

US 2022/0274300 A1    Sep. 1, 2022

Related U.S. Application Data

(63) Continuation of application No. PCT/JP2020/041743, filed on Nov. 9, 2020.

(30) Foreign Application Priority Data

Nov. 18, 2019 (JP) .................. 2019-208134

(51) Int. Cl.
*B29C 45/00* (2006.01)
*B29C 45/14* (2006.01)

(52) U.S. Cl.
CPC .......... *B29C 45/0025* (2013.01); *B29C 45/14* (2013.01); *B29C 2045/0027* (2013.01); *B29K 2995/0026* (2013.01)

(58) Field of Classification Search
CPC ................ B29C 45/0025; B29C 45/14; B29C 2045/0027; B29K 2995/0026
See application file for complete search history.

(56) References Cited

U.S. PATENT DOCUMENTS

| | | |
|---|---|---|
| 2002/0005773 A1 | 1/2002 | Uchiyama |
| 2012/0280536 A1 | 11/2012 | Malek et al. |
| 2012/0323078 A1 | 12/2012 | Kikumori et al. |
| 2013/0100690 A1 | 4/2013 | Dereani et al. |

FOREIGN PATENT DOCUMENTS

| | | |
|---|---|---|
| DE | 36 07 410 A1 | 9/1987 |
| DE | 10 2007 052 197 A1 | 4/2009 |
| JP | 2014-195921 A | 10/2014 |
| JP | 2021-079602 A | 5/2021 |
| JP | 2021-079603 A | 5/2021 |

OTHER PUBLICATIONS

U.S. Appl. No. 17/663,468 and its entire file history, filed May 16, 2022, Akimoto.

*Primary Examiner* — Joanna Pleszczynska

(74) *Attorney, Agent, or Firm* — Maschoff Brennan

(57) ABSTRACT

The molded body according to one aspect of the present disclosure is a molded body obtained by molding resin and used by allowing light to pass through the resin. This molded body includes: a plurality of gate marks each being as a mark of a gate through which the resin was injected during the molding; and a weld part disposed in such a manner as to avoid a position where the light passes through the resin.

6 Claims, 7 Drawing Sheets

MOLDED BODY AND PRODUCTION METHOD THEREOF

CROSS-REFERENCE TO RELATED APPLICATION

This application is the U.S. bypass application of International Application No. PCT/JP2020/041743 filed on Nov. 9, 2020 which designated the U.S. and claims priority to Japanese Patent Application No. 2019-208134 filed on Nov. 18, 2019 the contents of both of which are incorporated herein by reference.

TECHNICAL FIELD

The present disclosure relates to a molded body obtained by molding resin and a production method of the molded body.

BACKGROUND

A molded body has been proposed which is obtained by injecting molten resin into a mold through a gate thereby to mold (for example, injection mold) the resin into a shape corresponding to the space of the mold. Also, for example, as indicated in JP 2014-195921 A, it has been proposed to appropriately dispose an air releasing part for releasing the air in a gate outside a mold thereby to prevent a weld part from being formed.

SUMMARY

A molded body according to one aspect of the present disclosure is a molded body obtained by molding resin and used by allowing light to pass through the resin, and includes a plurality of gate marks and a weld part. The gate marks are each a mark of a gate through which the resin was injected during the molding. The weld part is disposed in such a manner as to be away from a position where the light passes through the resin.

A production method of the molded body according to another aspect of the present disclosure is a production method of the molded body which includes injecting resin into a mold through a plurality of gates to produce a molded body used by allowing light to pass through. In this production method, an embodiment of injecting individual resins through the plurality of gates is adjusted such that a weld part is disposed in such a manner as to avoid a position where the light passes through the resin.

The molded body according to further another aspect of the present disclosure is a molded body obtained by molding resin, in which the resin after molding is to be added with stress, and the molded body includes a plurality of gate marks and a weld part. The gate marks are each a mark of a gate through which the resin was injected during the molding. The weld part is disposed in such a manner as to avoid a position where larger stress is to be added compared to other positions in the resin.

The molded body according to further another aspect of the present disclosure is a molded body obtained by molding resin and used by being disposed such that the resin after molding is partly to be externally visible. Also, the molded body includes a plurality of gate marks and a weld part. The gate marks are each a mark of a gate through which the resin was injected during the molding. The weld part is disposed in such a manner as to avoid exposing it to external light.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
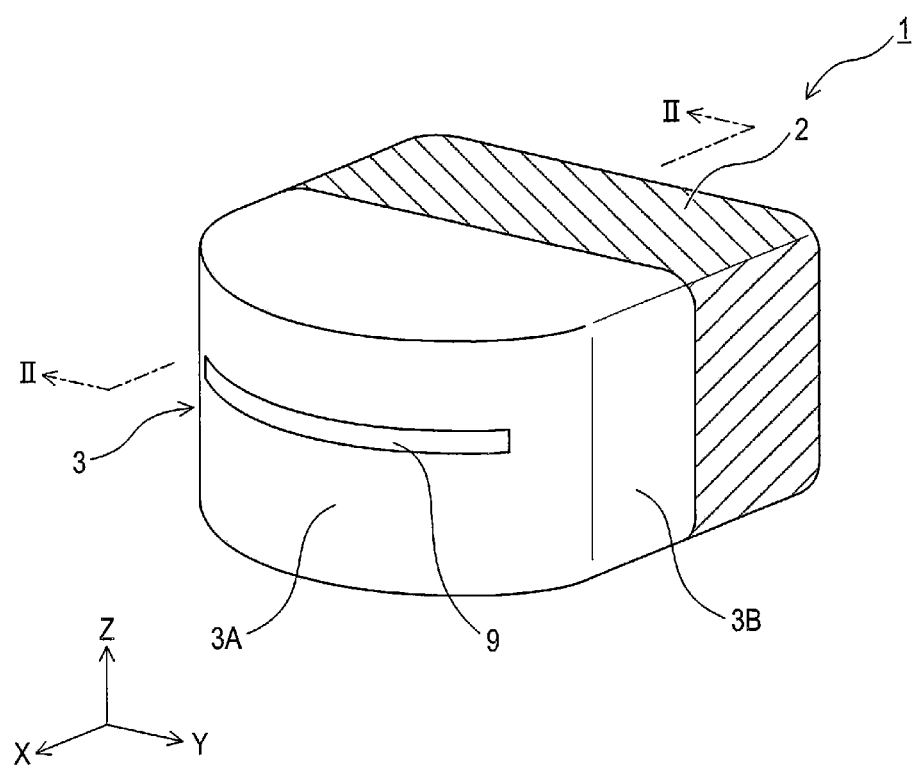
FIG. 1 is a perspective view illustrating a configuration of a radar apparatus according to a first embodiment.

The inventor conducted detailed research to find a problem in that the method indicated in JP 2014-195921 A does not completely prevent a weld part from being formed during molding of a molded body having any shape.

One aspect of the present disclosure desirably provides a technology in which even when a weld part is formed to a molded body obtained by molding resin, the weld part can be prevented from influencing the performance of the molded body.

A molded body according to one aspect of the present disclosure is a molded body obtained by molding resin and used by allowing light to pass through the resin, and includes a plurality of gate marks and a weld part. The gate marks are each a mark of a gate through which the resin was injected during the molding. The weld part is disposed in such a manner as to avoid a position where the light passes through the resin.

It is noted that the weld part is a portion in the molded body where the resins melted during molding joined together. An example of this weld part may be a weld line that is a linear concave portion created as a result of the melted resins linearly joining together.

According to such a configuration, the weld part is disposed in a position away from a position through which light passes. Consequently, even when a weld part is formed to the molded body of the present disclosure, the weld part can be prevented from influencing the light transmission-related performance of the molded body.

Also, the molded body includes a plurality of gate marks. That is, the molded body is molded by injecting the resin into a prescribed mold through a plurality of gates. Consequently, the weld part can be stably disposed, during molding of the molded body, in a position where the above-described effect is exerted.

A production method of the molded body according to another aspect of the present disclosure is a production method of the molded body which includes injecting resin into a mold through a plurality of gates to produce a molded body used by allowing light to pass through. In this production method, an embodiment of injecting individual resins through the plurality of gates is adjusted such that a weld part is disposed in such a manner as to avoid a position where the light passes through the resin.

In the molded body produced by this production method, a weld part is disposed in a position that avoids a position through which light passes. Consequently, even when a weld part is formed to the molded body, the weld part can be prevented from influencing the light transmission-related performance of the molded body. Also, in this production method, the resin is injected into the mold through a plurality of the gates to mold a molded body. Consequently, the weld part can be also stably disposed, during molding of the molded body, in a position where the above-described effect is exerted.

The molded body according to further another aspect of the present disclosure is a molded body obtained by molding resin, in which the resin after molding is to be added with stress, and the molded body includes a plurality of gate marks and a weld part. The gate marks are each a mark of a gate through which the resin was injected during the molding. The weld part is disposed in such a manner as to avoid a position where larger stress is to be added compared to other positions in the resin.

According to such a configuration, the weld part is disposed in a position that avoids a position to which larger stress is to be added compared to other positions. Consequently, even when a weld part is formed to the molded body, the weld part can be prevented from influencing the strength and/or durability-related performance of the molded body. Also, the molded body includes a plurality of gate marks. That is, the molded body is molded by injecting the resin into a prescribed mold through a plurality of gates. Consequently, the weld part can be also stably disposed, during molding of the molded body, in a position where the above-described effect is exerted.

The molded body according to further another aspect of the present disclosure is a molded body obtained by molding resin and used by being disposed such that the resin after molding is partly to be externally visible. Also, the molded body includes a plurality of gate marks and a weld part. The gate marks are each a mark of a gate through which the resin was injected during the molding. The weld part is disposed in such a manner as to avoid exposing it to external light.

Positions exposed to external light may be viewed by the human eye during use of the molded body, and design features of the molded body a likely to matter. On the other hand, according to the above-described configuration, the weld part is disposed in a position that avoids externally-exposed parts. Consequently, even when a weld part is formed to the molded body, the weld part can be prevented from influencing the design features-related performance of the molded body.

Also, the molded body includes a plurality of gate marks. That is, the molded body is molded by injecting the resin into a prescribed mold through a plurality of gates. Consequently, the weld part can be also stably disposed, during molding of the molded body, in a position where the above-described effect is exerted.

Hereinafter, illustrative embodiments for carrying out the present disclosure will be described with reference to the drawings.

1. First Embodiment

1-1. Configuration

Figure 2:
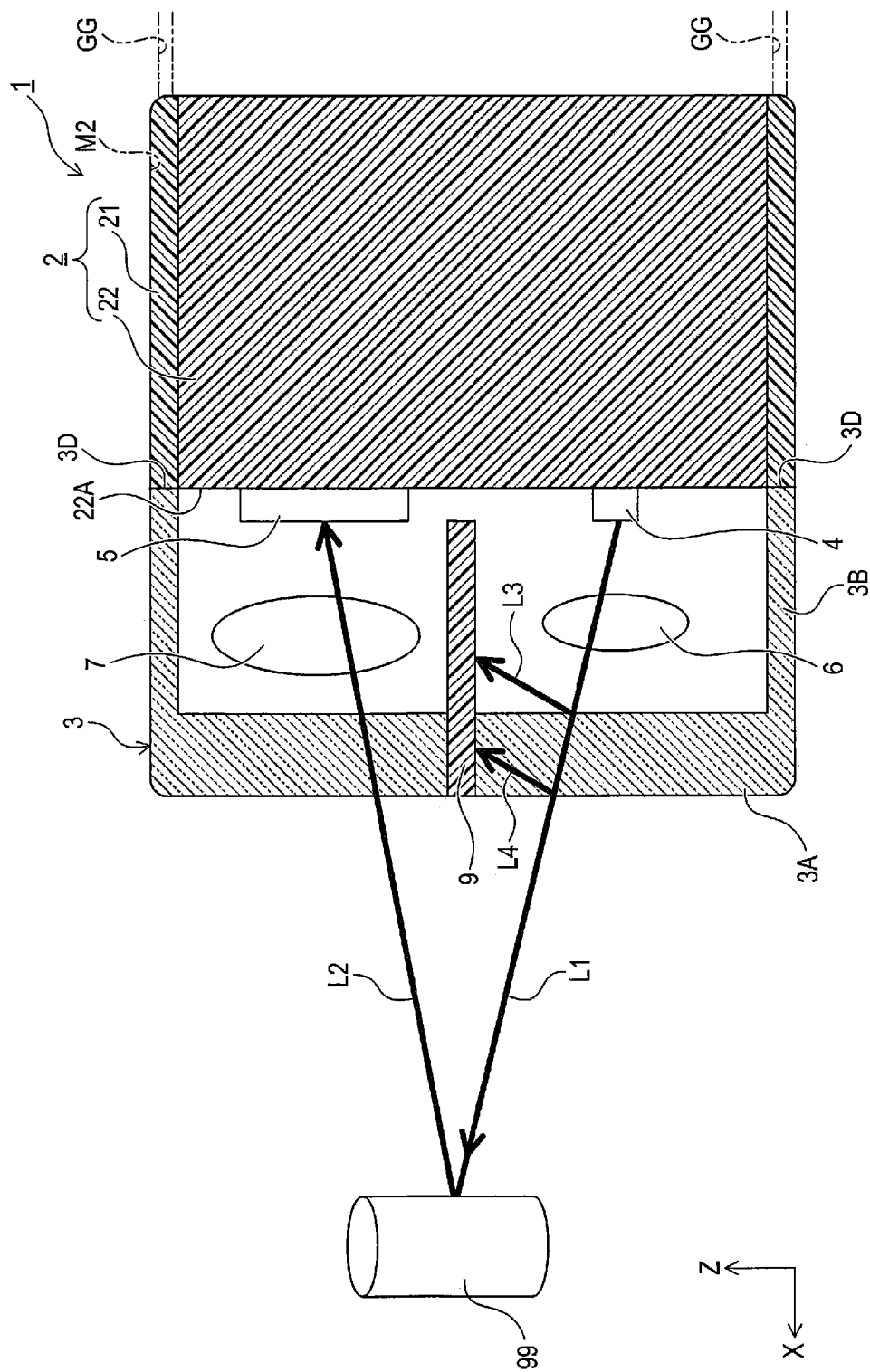
FIG. 2 is an illustrative view schematically indicating an internal configuration of the radar apparatus according to the first embodiment, taken along the II-II cross section line in FIG. 1.

As illustrated in FIG. 1, a radar apparatus 1 according to an embodiment includes a body part 2 and a cover part 3. The body part 2 is constituted in a rectangular parallelepiped shape by a resin having substantially no light transmittance. More specifically, as illustrated in FIG. 2, the body part 2 includes a cover retaining member 21 having a tubular shape with a rectangular cross section (that is, a rectangular tube shape) and a detection part retaining member 22 having a rectangular prism shape that fits into the hollow part of the cover retaining member 21.

A light emitting part 4 and a light receiving part 5 as a detection part are mounted on one end surface of the detection part retaining member 22, particularly on a surface (that is, a surface on the cover part 3 side) 22A which does not face the inner circumferential surface of the cover retaining member 21. The light emitting part 4 may be constituted by, for example, a semiconductor element such as a laser diode, but another configuration that emits certain light may be adopted. Also, the light receiving part 5 may be constituted by, for example, a semiconductor element such as a photo diode, but another configuration that detects the above-described light may be adopted.

It is noted that in the following description, a right-handed coordinate system is used, in which a +X direction is a direction of a normal line to the end surface 22A, and a +Z direction is a direction of an edge along a direction running from the mounting position of the light emitting part 4 toward the mounting position of the light receiving part 5, among edges (that is, ridges) of the body part 2.

However, these directions are directions merely defined for convenience in order to simply describe a relative positional relationship of parts constituting the radar apparatus 1. An actual direction in which the radar apparatus 1 is directed in use is optional. For example, when the radar apparatus 1 is mounted, as a radar apparatus for vehicles, on a vehicle, it may be mounted such that the +Z direction faces upward, or the +X direction faces upward. Also, the radar apparatus 1 may be mounted on a vehicle in other postures.

The cover part 3 is constituted by, for example, a transparent resin having light transmittance. The cover part 3 includes, as illustrated in FIG. 1, a light transmitting part 3A having a halved cylindrical shape (that is, a half cylindrical shape) and a base part 3B having a tubular shape with a rectangular cross section (that is, a rectangular tube shape).

The base part 3B viewed from the ±X direction has a rectangular frame shape. The outer circumferential surfaces of the base part 3B at the ±Y side and the ±Z side have a size that connects to the outer circumferential surfaces of the cover retaining member 21 at the ±Y side and the ±Z side. The inner circumferential surfaces of the base part 3B have a size that does not interfere with either of the optical path of the light emitted by the light emitting part 4 or the optical path of the light to be received by the light receiving part 5.

Also, the inner circumferential surfaces of the base part 3B have a size that connects to the inner circumferential surfaces of the cover retaining member 21.

The light transmitting part 3A is constituted in a halved cylindrical shape that has the central axis in the ±Z direction and is convex in the +X direction. In particular, the light transmitting part 3A has a semi-circular shape when viewed from the ±Z direction, and has a surface shape curved along the circumferential surface of a cylinder. It is noted that the shape of the light transmitting part 3A may not be a halved cylinder cut along the central axis (that is, a cylinder with a center angle of 180°), and may be a cylinder with a center angle of less than 180°.

End surfaces at the −X side on the ±Y-side ends of the light transmitting part 3A are individually connected to end surfaces at the +X side in the ±Y-side portions of the base part 3B. Also, end surfaces at the +X side in the ±Z-side portions of the base part 3B each extend in an arc shape toward the +X direction so as to contact edges at the ±Z side in the inner circumferential surface (that is, a surface at the −X side) of the light transmitting part 3A.

Also, as illustrated in FIG. 2, a lens 6 that collects light emitted by the light emitting part 4 is disposed between the light emitting part 4 and the light transmitting part 3A. A lens 7 that collects light to be received by the light receiving part 5 is disposed between the light receiving part 5 and the light transmitting part 3A. The lens 6 is supported by a support member disposed to the detection part retaining member 22 such that the positional relationship with the light emitting part 4 is defined. Similarly, the lens 7 is supported by a support member disposed to the detection part retaining member 22 such that the positional relationship with the light receiving part 5 is defined. However, these support members are not illustrated in the drawings.

Also, a light shielding member 9 that prevents the light emitted by the light emitting part 4 from entering the light receiving part 5 without passing through the light transmitting part 3A is disposed to the light transmitting part 3A in such a manner as to project toward the inner circumferential side (that is, the −X side). The light shielding member 9 has a plate-like shape in which the size in the ±Z direction is smaller than the size in the ±X direction and the size in the ±Y direction, and projects from the inner circumferential side of the light transmitting part 3A in such a manner as to approach as close as possible to a space between the light emitting part 4 and the light receiving part 5, as illustrated in FIG. 2.

Light L1 emitted by the light emitting part 4 is reflected by an observation object 99 to become reflected light L2. The light receiving part 5 receives the reflected light L2 via the light transmitting part 3A and the lens 7. At this time, a part of the light L1 is reflected by the inner circumferential surface (that is, a surface at the −X side) of the light transmitting part 3A, like light L3. Also, another part of the light L1 is reflected by the outer circumferential surface (that is, a surface at the +X side) of the light transmitting part 3A, like light L4. The light shielding member 9 is constituted by a material having no light transmittance and prevents the lights L3, L4, and others from entering the light receiving part 5.

Figure 3:
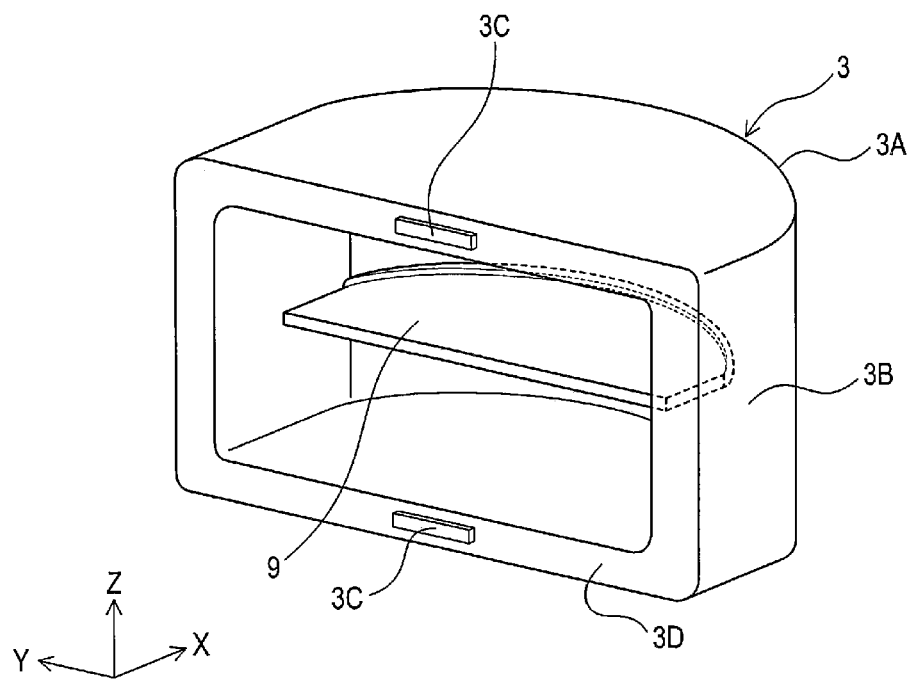
FIG. 3 is a perspective view illustrating a configuration of a cover part according to the first embodiment.

As illustrated in FIG. 1 and FIG. 3, the end surface at the +X side in the light shielding member 9 is disposed on the same cylindrical surface as the outer circumferential surface of the light transmitting part 3A. Also, the end surface on the ±Y side of the light shielding member 9 is formed in a straight line disposed with a gap from the inner circumferential surface in the ±Y direction of the base part 3B, and project from the inner circumferential surface of the light transmitting part 3A toward the −X direction. The end surface at the −X side in the light shielding member 9 is linearly constituted in such a manner as to connect the −X-side ends of the end surfaces at the ±Y side in the light shielding member 9.

Here, the cover part 3 is formed by injection molding. As illustrated in FIG. 3, the number of gate marks 3C formed to the cover part 3 during the injection molding is two. These gate marks 3C are individually disposed to the center portions of edges on the ±Z sides (that is, the centers in the ±Y direction) on an end surface 3D at the −X side of the base part 3B.

1-2. Production Method of Radar Apparatus 1

Hereinafter, a production method of the radar apparatus 1 will be described mainly regarding an injection molding method of the cover retaining member 21 and the cover part 3.

First, the light shielding member 9 is produced independently from other portions in the cover part 3 and the cover retaining member 21. The light shielding member 9 may be produced by injection molding a resin having no light transmittance, by molding the resin through a method other than injection molding, or by another material such as wood or ceramic.

Figure 4:
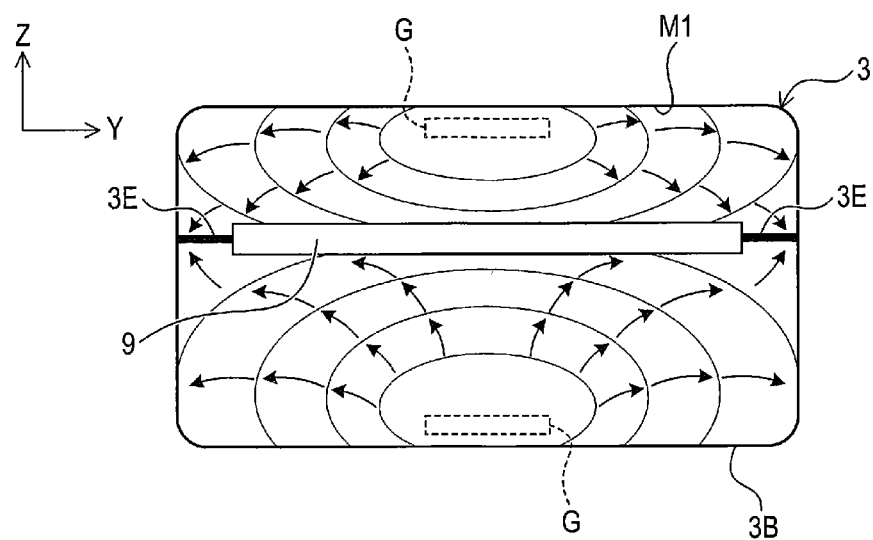
FIG. 4 is a schematic view illustrating a flow of resin during production of the cover part according to the first embodiment.

Subsequently, as illustrated in FIG. 4, the light shielding member 9 is placed in a prescribed mold (hereinafter, a first mold M1) that corresponds to the shape of the cover part 3, and a resin (hereinafter, a first resin) to constitute the light transmitting part 3A and the base part 3B is injected in the first mold M1. Here, the first resin is a resin having light transmittance as described above.

This first resin is molded as the light transmitting part 3A and the base part 3B by insert molding (that is, an example of injection molding) with the light shielding member 9 as an insert component. A highly sophisticated technique is required for molding the entirety of the cover part 3 including the light shielding member 9 by one injection molding. Therefore, the light shielding member 9 is previously molded, and then the light transmitting part 3A and the base part 3B are molded by insert molding so as to integrate with the light shielding member 9.

Also, at this time, two gates G through which the first resin is injected into the first mold M1 are individually disposed, as illustrated in FIG. 4, in positions corresponding to the gate marks 3C, that is, in positions corresponding to the centers in the ±Y direction at the ±Z-side edges of the base part 3B. When the first resin is injected into the first mold M1 through these two gates G, the first resin flows as indicated by arrows in FIG. 4. The injection speeds of the resins through the two gates G can be individually adjusted in an appropriate manner such that weld lines 3E created as a result of the resins injected through the two gates G joining together are formed so as to individually extend in the ±Y direction at both sides in the ±Y direction of the light shielding member 9.

Figure 5:
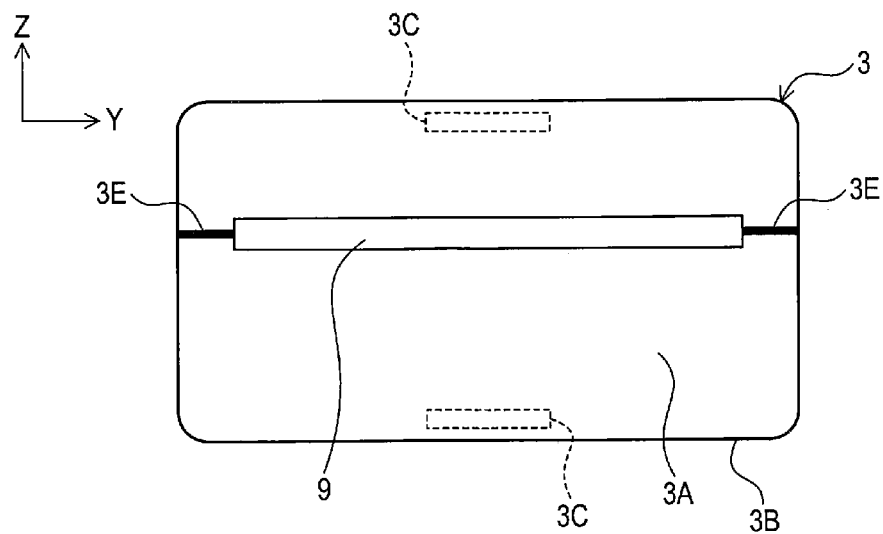
FIG. 5 is a schematic view illustrating positions of weld lines in the cover part according to the first embodiment.

After the cover part 3 molded in this manner has been cooled and solidified, it is removed from the first mold M1 to obtain a cover part 3 illustrated in FIG. 5. This cover part 3 has weld lines 3E, which are individually linearly extend in the ±Y direction, at both sides in the ±Y direction of the light shielding member 9, and also has the gate marks 3C in the center portions of edges at the ±Z side on the end surface 3D at the −X side of the base part 3B.

Figure 6:
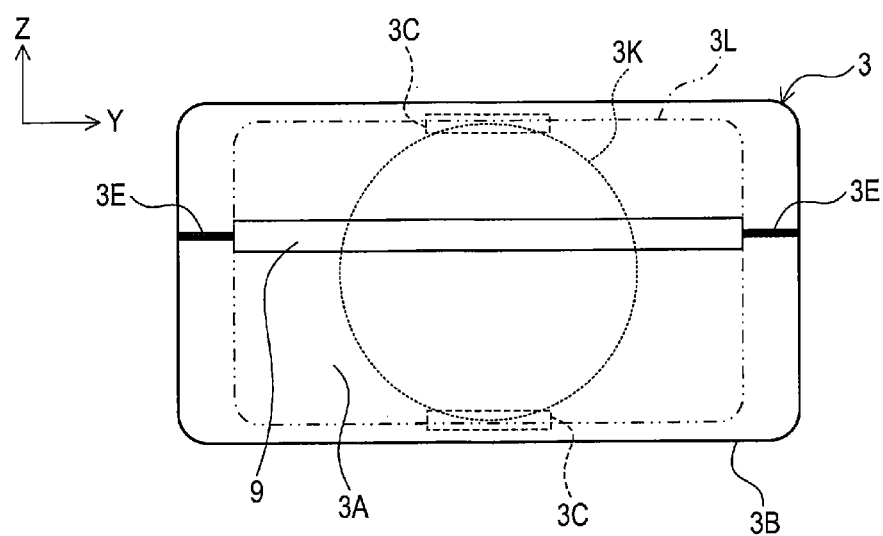
FIG. 6 is a schematic view illustrating a positional relationship between the weld lines and the main part of the cover part according to the first embodiment.

While the radar apparatus 1 is mounted on a vehicle and while the radar apparatus 1 is used, greater stress occurs at a position in the cover part 3 indicated by 3K in FIG. 6, that is, to the circular range in the center of the light transmitting part 3A, compared to other positions in the cover part 3. Also, a position in the cover part 3 indicated by 3L in FIG. 6, that is, the rectangular range excluding the vicinity of the outer circumferential portion of the light transmitting portion 3A, is a position which is to be exposed to outside a vehicle or inside a vehicle interior and subjected to outside light and is required to have design features compared to other positions in the cover part 3.

The weld lines 3E are disposed in positions that avoid positions at which large stress will occur in the cover part and a position in the cover part 3 required to have design features. Also, as understood from FIG. 2 and FIG. 5, the weld lines 3E are disposed in positions away from the light paths of light L1 emitted by the light emitting part 4 and reflected light L2 corresponding to the light L1.

Subsequently, the cover part 3 is disposed in a prescribed mold (hereinafter, a second mold M2) that corresponds to the shape of the cover retaining member 21, and a resin (hereinafter, a second resin) to constitute the cover retaining member 21 is injected in the second mold M2 through gates GG illustrated in FIG. 2. It is noted that the locations of the gates GG are not limited to the positions illustrated in FIG. 2, and may be other positions. Here, the second resin is a resin having no light transmittance as described above.

This second resin is molded as the cover retaining member 21 by insert molding (that is, an example of injection molding) with the cover part 3 as an insert component. Through the injection molding process, the second resin is bonded to the two gate marks 3C, and the cover retaining member 21 is bonded to the end surface 3D at the −X side in the base part 3B.

After this cover retaining member 21 has been cooled and solidified, the detection part retaining member 22 mounted with the light emitting part 4 and the light receiving part 5 is attached to the hollow portion of the cover retaining member 21 to obtain the radar apparatus 1. It is noted that although the light emitting part 4 and the light receiving part 5 are mounted on a printed circuit board disposed on the end surface 22A of the detection part retaining member 22, the printed circuit board is omitted in FIG. 2. Also, when the detection part retaining member 22 is constituted by a multilayer substrate or the like, the light emitting part 4 and the light receiving part 5 may be directly mounted on the multilayer substrate.

1-3. Effects

According to the above-detailed first embodiment, the following effects are exerted.

(1A) The gate marks 3C in the cover part 3 are disposed on the end surface 3D as a bonding surface to be bonded to the cover retaining member 21 having no light transmittance. Therefore, even when the gate marks 3C are not smoothed, the gate marks 3C can be prevented from influencing the light passing through the cover part 3. For example, even when the light propagating in the cover part 3 reaches the gate marks 3C which are not completely smoothed, the gate marks 3C are bonded to the cover retaining member 21. Consequently, the light reflected by the gate mark 3C is sometimes blocked by the cover retaining member 21 even if it would otherwise emerge from the cover part 3. Therefore, even when the gate marks 3C are not smoothed, reduction in optical properties of the cover part 3 can be suppressed.

(1B) The cover retaining member 21 is molded by injecting the second resin into the second mold M2 such that the second resin is bonded to the gate marks 3C in the cover part 3. This sometimes causes the gate marks 3C to melt and disappear during molding of the cover retaining member 21, which can further favorably suppress the reduction in optical properties of the cover part 3. Also, even when the gate marks 3C do not melt during molding of the cover retaining member 21, the surroundings of the gate marks 3C can be favorably hidden by a resin constituting the cover retaining member 21, which can favorably suppress the reduction in optical properties of the cover part 3.

(1C) As illustrated in FIG. 2 and FIG. 5, the weld lines 3E are disposed in positions that avoid the light paths of light L1 emitted by the light emitting part 4 and reflected light L2 corresponding to the light L1 (that is, positions where light passes through resin). That is, the weld lines 3E are disposed in such a manner as to avoid positions where light associated with the light emitting part 4 and the light receiving part 5 pass through the cover part 3. Consequently, the weld lines 3E are prevented from influencing the observation of the observation object 99 by the radar apparatus 1.

(1D) As illustrated in FIG. 6, the weld lines 3E are disposed in positions that avoid a position (that is, a position indicated by 3K) in the cover part 3 where great stress occurs. Consequently, the weld lines 3E are prevented from influencing the strength and durability of the cover part 3.

(1E) The weld lines 3E are disposed in positions that avoid a position in the cover part 3 where design features are required, that is, a position indicated by 3L, and a position to be externally visible. Consequently, the weld lines 3E are prevented from influencing the design features of the cover part 3.

(1F) The cover part 3 includes a plurality of gate marks 3C. That is, the cover part 3 is molded by injecting the first resin into the first mold M1 through the plurality of gates G. Consequently, the weld lines 3E can be stably disposed, during molding of the cover part 3, in a position where the effects (1C) to (1E) are exerted.

(1G) Also, the first resin is molded such that the cover part 3 integrates with the light shielding member 9, as an insert component, molded independently from the light transmitting part 3A and the base part 3B. Consequently, the control of the flow of the first resin during molding of the cover part 3 is facilitated, and the weld lines 3E can be further stably disposed in a position where the effects (1C) to (1E) are exerted.

2. Second Embodiment 2-1. Differences from First Embodiment

Since the fundamental configuration of a second embodiment is similar to that in the first embodiment, differences will be described below. It is noted that the same reference numerals as those in the first embodiment indicates the same configuration, and the previous description should be referred to.

Figure 7:
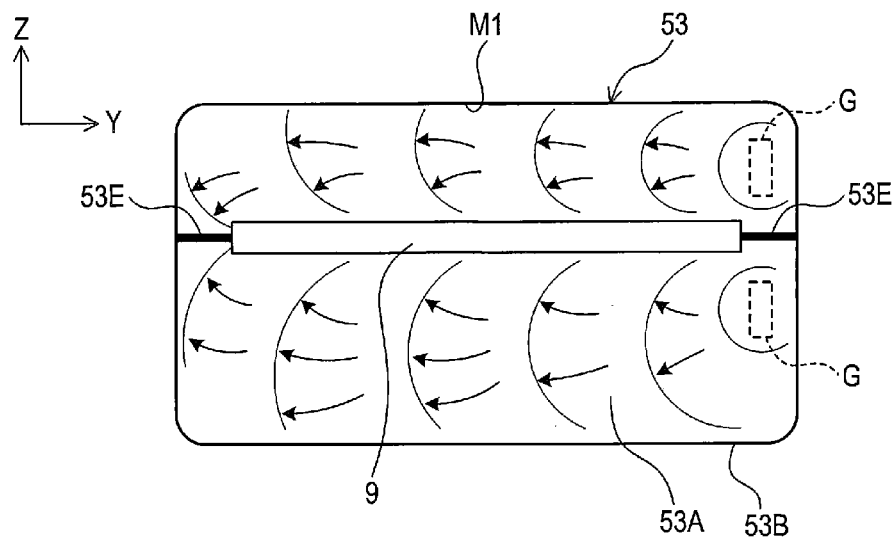
FIG. 7 is a schematic view illustrating a flow of resin during production of a cover part according to a second embodiment.

The cover part 3 in the first embodiment was molded by injecting the first resin through two gates G disposed in positions corresponding to the centers in the ±Y direction at the ±Z-side edges of the base part 3B. On the other hand, as illustrated in FIG. 7, a cover part 53 in the second embodiment differs in that it is molded by injecting the first resin through two gates G disposed in positions corresponding to the +Y side-edge of a base part 53B in such a manner as to be spaced apart in the ±Z direction. More specifically, the two gates G are disposed such that an XY plane passing through the light shielding member 9 is sandwiched between the two gates G from the ±Z direction. When such a first mold M1 is used to mold the cover part 53, the first resin flows as indicated by arrows in FIG. 7.

In this case, the injection speeds of the resins through the two gates G can also be individually adjusted in an appropriate manner such that weld lines 53E created as a result of the resins injected through the two gates G joining together are formed so as to individually extend in the ±Y direction at both sides in the ±Y direction of the light shielding member 9.

Figure 8:
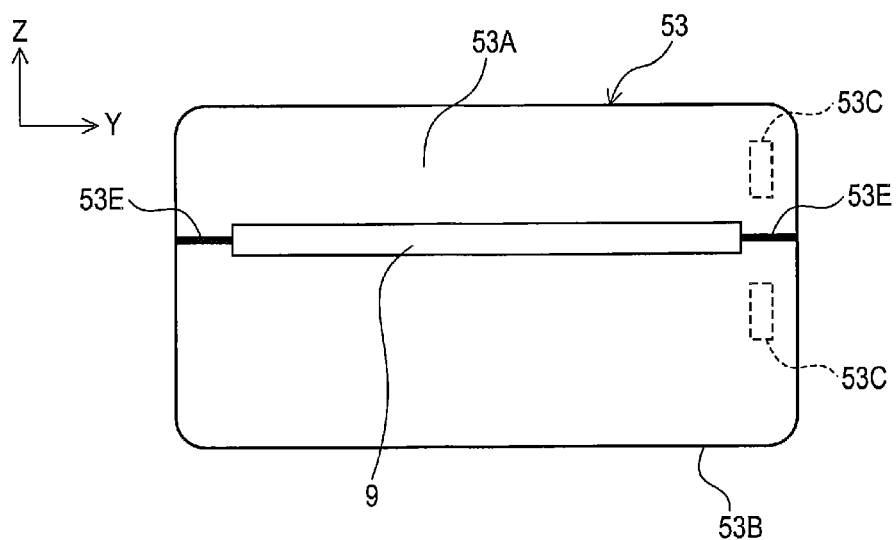
FIG. 8 is a schematic view illustrating positions of weld lines in the cover part according to the second embodiment.

After the cover part 53 molded in this manner has been cooled and solidified, it is removed from the first mold M1 to obtain a cover part 53 illustrated in FIG. 8. This cover part 53 has weld lines 53E, which are individually linearly extend in the ±Y direction, at both sides in the ±Y direction of the light shielding member 9, and also has two gate marks 53C spaced apart in the ±Z directions at the +Y-side edge on the −X-side end surface in the base part 53B.

2-2. Effects

Therefore, effects similar to the above-described (1A) to (1G) in the first embodiment are also exerted in the second embodiment including the cover part 53 in place of the cover part 3 in the first embodiment.

3. First Comparative Example

3-1. Differences from First Embodiment

Since the fundamental configuration of a first comparative example is similar to that in the first embodiment, differences will be described below. It is noted that the same reference numerals as those in the first embodiment indicates the same configuration, and the previous description should be referred to.

Figure 9:
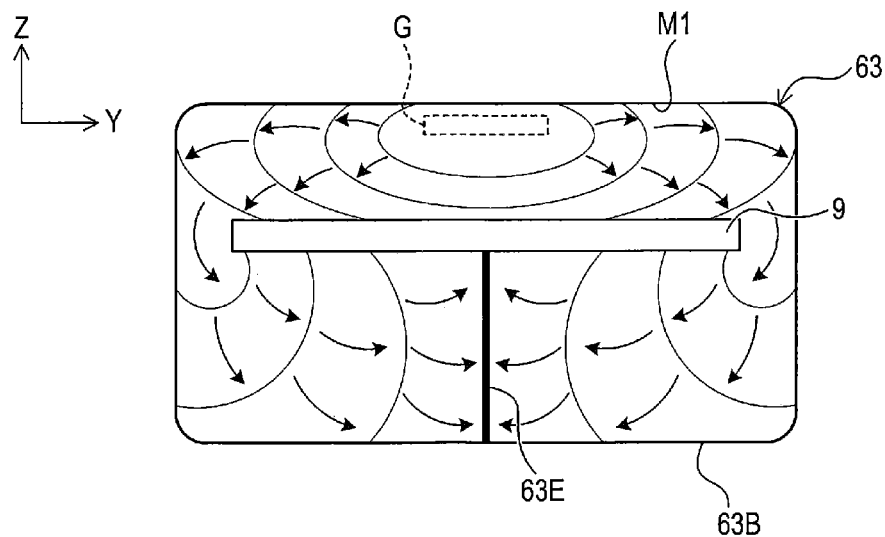
FIG. 9 is a schematic view illustrating a flow of resin during production of a cover part according to a first comparative example.

The cover part 3 in the first embodiment was molded by injecting the first resin through two gates G individually disposed in positions corresponding to the centers in the ±Y direction at the ±Z-side edges of the base part 3B. On the other hand, as illustrated in FIG. 9, a cover part 63 in the first comparative example differs in that it is molded by injecting the first resin through a gate G disposed in a position corresponding to the center in the ±Y direction at the +Z-side edge of a base part 63B. When such a first mold M1 is used to mold the cover part 63, the first resin flows as indicated by arrows in FIG. 9.

Figure 10:
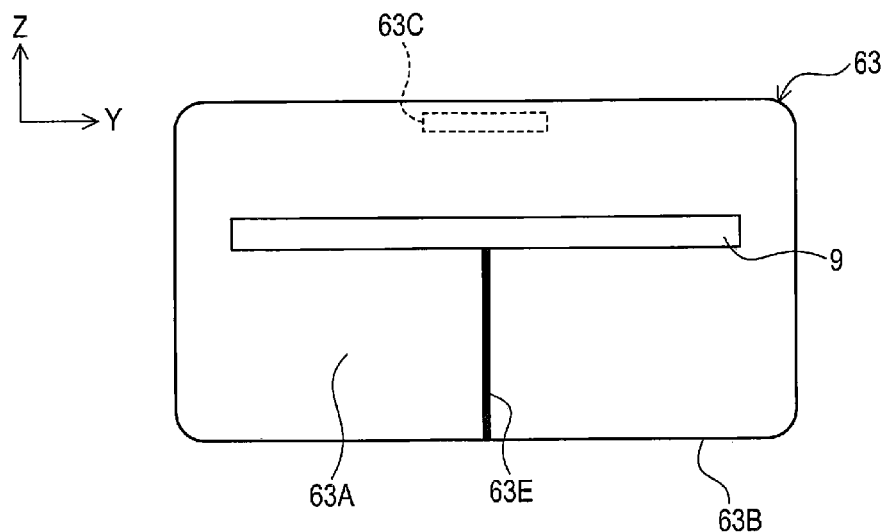
FIG. 10 is a schematic view illustrating a position of a weld line in the cover part according to the first comparative example.

In this case, a weld line 63E created as a result of the resin injected through the gate G joining together is formed in such a manner as to extend in the −Z direction from the center in the ±Y direction on the −Z-side surface of the light shielding member 9. After the cover part 63 molded in this manner has been cooled and solidified, it is removed from the first mold M1 to obtain a cover part 63 illustrated in FIG. 10. This cover part 63 has a linear weld line 63E that extends in the −Z direction from the center in the ±Y direction on the −Z-side surface of the light shielding member 9, and also has a gate mark 63C at the center in the ±Y direction of the +Z-side edge on the −X-side end surface in the base part 63B.

3-2. Effects

Therefore, in the first comparative example including the cover part 63 in place of the cover part 3 in the first embodiment, effects similar to the above-described (1A) and (1B) in the first embodiment are exerted, but effects similar to (1C) to (1G) are not exerted.

4. Second Comparative Example

4-1. Differences from First Embodiment

Since the fundamental configuration of a second comparative example is similar to that in the first embodiment, differences will be described below. It is noted that the same reference numerals as those in the first embodiment indicates the same configuration, and the previous description should be referred to.

Figure 11:
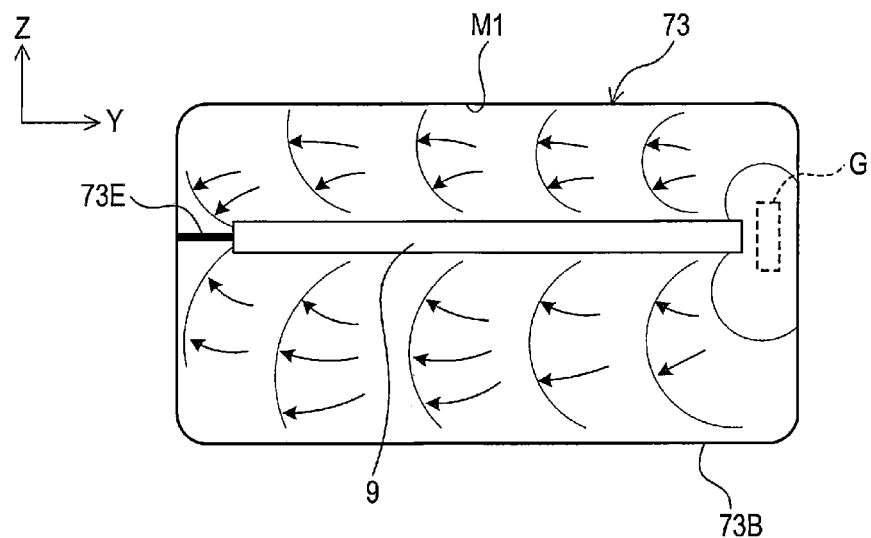
FIG. 11 is a schematic view illustrating a flow of resin during production of a cover part according to a second comparative example.

The cover part 3 in the first embodiment was molded by injecting the first resin through two gates G individually disposed in positions corresponding to the centers in the ±Y direction at the ±Z-side edges of the base part 3B. On the other hand, as illustrated in FIG. 11, a cover part 73 in the second comparative example differs in that it is molded by injecting the first resin through one gate G disposed in a position corresponding to the +Y-side edge of a base part 73B. When such a first mold M1 is used to mold the cover part 73, the first resin flows as indicated by arrows in FIG. 11.

Figure 12:
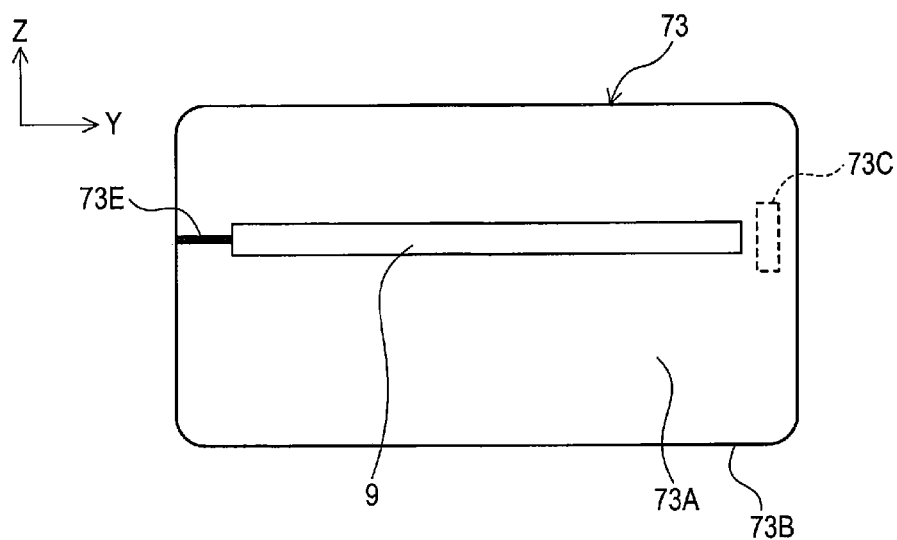
FIG. 12 is a schematic view illustrating a position of a weld line in the cover part according to the second comparative example.

In this case, a weld line 73E created as a result of the resins injected through the gate G joining together is formed in such a manner as to extend in the −Y direction at the −Y side of the light shielding member 9. After the cover part 73 molded in this manner has been cooled and solidified, it is removed from the first mold M1 to obtain a cover part 73 illustrated in FIG. 12. This cover part 73 has a linear weld line 73E that extends in the −Y direction from the −Y side of the light shielding member 9, and also has a gate mark 73C at the center in the ±Z direction of the +Y-side edge on the −X-side end surface in the base part 73B.

4-2. Effects

Therefore, in the second comparative example including the cover part 73 in place of the cover part 3 in the first embodiment, effects similar to the above-described (1A) to (1E) in the first embodiment are exerted.

5. Correspondence Relation of Terms

In the relation between each of the above-described embodiments and the present disclosure, the cover retaining member 21 corresponds to the second molded body and another member. The end surface 3D corresponds to the bonding surface. The light shielding member 9 corresponds to an insert component. The cover part 3 or the cover part 53 corresponds to the first molded body. The injection molding process using the first mold M1 corresponds to the first process. The injection molding process using the second mold M2 corresponds to the second process. The gate G corresponds to the first gate. The gate GG corresponds to the second gate.

6. Other Embodiments

Although embodiments of the present disclosure have been described above, the present disclosure is not limited to the above-described embodiments, which can be variously modified for implementation.

(6A) In the above-described embodiments, the cover part 3 or the like was placed in the second mold M2, and the second resin was injected into the second mold M2 to mold the cover retaining member 21. However, the present disclosure is not limited to this. For example, the cover retaining member 21 may be molded independently from the cover part 3 or the like, and bonded to the end surface 3D or the like by adhesion or other methods after the second resin has been solidified. Also, instead of bonding the cover retaining member 21 to the end surface 3D without a space therebetween, a space between the cover retaining member 21 and the end surface 3D may be bridged with a seal material or the like. In such a case, effects similar to the above-described embodiments are also exerted, because the gate mark 3C or the like is disposed to a portion hidden by the seal material.

(6B) In the first embodiment and the second embodiment, the injection speeds of the resins through the two gates G were individually adjusted in an appropriate manner, as a method for adjusting the positions of the weld lines 3E. However, the present disclosure is not limited to this. An example of the method may include individually adjusting the injection pressures of the resins through the two gates G in an appropriate manner or disposing, to an appropriate position in the mold, an air hole for releasing the air in the mold. Also, the number of gates G may be three or more. For example, the two gates G in the first embodiment may be individually divided into two such that four gates G are disposed. Also, the sizes of the multiple gates G may be varied such that the positions of the weld lines 3E are adjusted taking advantage of the fact that more resin flows from a larger gate G.

That is, an embodiment of injecting individual resins through a plurality of gate may be the injection speeds of the resins, the injection pressures of the resins, the individual sizes of the plurality of gates, or other embodiments related to the formed position of the weld part.

(6C) In the above-described embodiments, the cover part 3 was molded by insert molding with the light shielding member 9 as an insert component. However, the present disclosure is not limited to this. For example, the entirety of the cover part 3 including the light shielding member 9 may be molded by one injection molding. However, when an insert component is used, the control of the flow of the first resin during molding of the cover part 3 is easier in some cases.

(6D) In the above-described embodiments, the present disclosure was applied for the cover part in the radar apparatus 1 for vehicles. However, the present disclosure is not limited to this. For example, the radar apparatus 1 may be a radar apparatus other than a radar apparatus for vehicles, and the cover part 3 may be a cover part in another optical device such as an optical sensor.

(6E) A plurality of functions provided by one constituent in the above-described embodiments may be achieved by a plurality of constituents, or one function provided by one constituent may be achieved by a plurality of constituents. Also, a plurality of functions provided by a plurality of constituents may be achieved by one constituent, or one function provided by a plurality of constituents may be achieved by one constituent. Also, the configuration of each of the above-described embodiments may be partly omitted. Also, at least a part of the configuration of each of the above-described embodiments may be added to or replace the configuration of another embodiment.

What is claimed is:

1. A molded body formed by molding a resin and configured to allow light to pass through the resin, the molded body comprising:

a plurality of gate marks corresponding to a plurality of gates, each of the plurality of gate marks comprising a mark of a gate through which the resin was injected during the molding; and
   a weld part comprised of the resin that is injected through the plurality of gates, the weld part formed from a plurality of flows of resin that flow through the plurality of gates and join together, the weld part positioned away from a position where the light passes through the resin,
   wherein
   the weld part extends in a linear direction,
   the molded body further includes an insert component molded independently of the molded body, and
   the gate marks are disposed in each area divided by the insert component and the weld part.

2. The molded body according to claim 1, the molded body comprising
   a first molded body that is bonded with a second molded body, the second molded body formed separately from the first molded body, wherein
   the gate marks are disposed on a surface of the first molded body, and the surface is bonded to the second molded body.

3. A molded body formed by molding a resin, in which stress is added to the resin after molding, the molded body comprising:
   a plurality of gate marks corresponding to a plurality of gates, each of the plurality of gate marks comprising a mark of a gate through which the resin was injected during the molding; and
   a weld part comprised of the resin that is injected through the plurality of gates, the weld part formed from a plurality of flows of resin that flow through the plurality of gates and join together, the weld part disposed at positions where stress is lower relative to other positions in the resin,
   wherein
   the weld part extends in a linear direction,
   the molded body further includes an insert component molded independently of the molded body, and
   the gate marks are disposed in each area divided by the insert component and the weld part.

4. A molded body obtained by molding a resin, the resin after molding being partially visible externally, the molded body comprising:
   a plurality of gate marks corresponding to a plurality of gates, each of the plurality of gate marks comprising a mark of a gate through which the resin was injected during the molding; and
   a weld part comprised of injecting the resin that is injected through the plurality of gates, the weld part formed from a plurality of flows of resin that flow through the plurality of gates and join together, the weld part disposed at a position that is not externally visible,
   wherein
   the weld part extends in a linear direction,
   the molded body further includes an insert component molded independently of the molded body, and
   the gate marks are disposed in each area divided by the insert component and the weld part.

5. A production method of forming a molded body by injecting a resin into a mold through a plurality of gates to produce the molded body through which light passes through, the method comprising:
   injecting the resin through the plurality of gates; and
   joining the resin together at a weld part, wherein
the weld part formed from a plurality of flows of resin that flow through the plurality of gates and join together,
the weld part is positioned away from a position at which the light passes through the resin, and
the weld part extends in a linear direction,
the molded body further includes an insert component molded independently of the molded body, and
the gate marks are disposed in each area divided by the insert component and the weld part.

6. The production method according to claim 5, wherein the weld part is positioned away from the position at which the light passes through the resin by controlling injection speeds of the plurality of flows of resin through the plurality of gates.

* * * * *